April 9, 1929.     W. D. GUINDON     1,708,131
CIRCULAR SAW AND TOOTH CONSTRUCTION
Filed Dec. 16, 1927
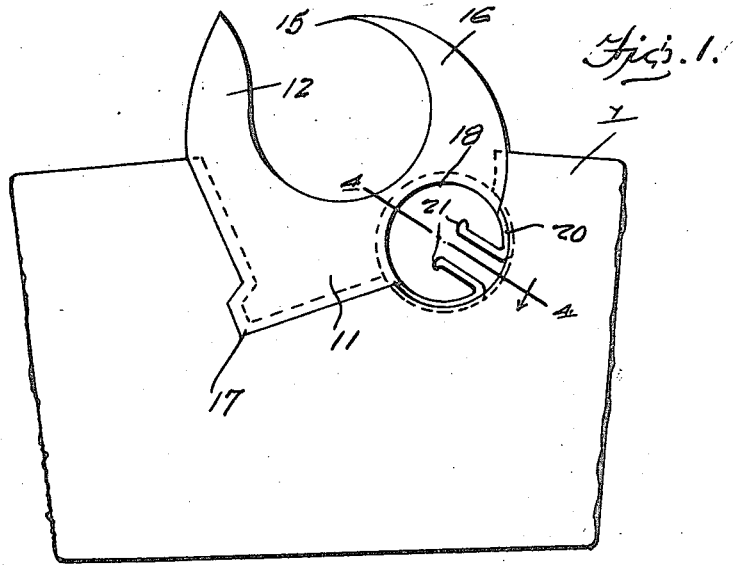
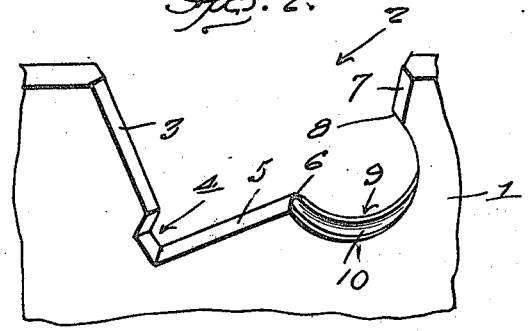
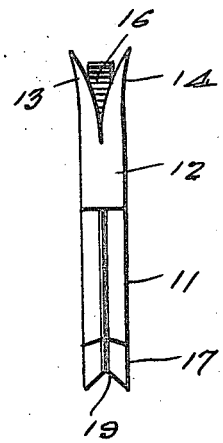
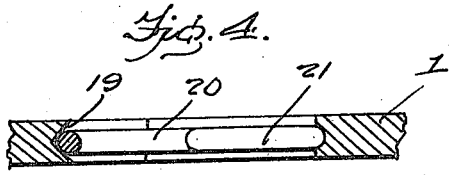
Inventor
William D. Guindon
By *Clarence A. O'Brien*
Attorney Patented Apr. 9, 1929.

1,708,131

UNITED STATES PATENT OFFICE.

WILLIAM DILLED GUINDON, OF MIDVALE, NEW JERSEY.

CIRCULAR SAW AND TOOTH CONSTRUCTION.

Application filed December 16, 1927. Serial No. 240,536.

My invention relates to improvements in circular saw and tooth constructions, wherein the circular saw is particularly adapted to receive detachable teeth of novel construction.

The purpose of my invention is to provide a new and useful circular saw, wherein the same is so constructed as to receive detachable tooth members, of novel construction, and adapted for the purpose as more specifically set out in the drawings, and specification.

The main object of my improved saw is to provide a detachable tooth especially useful in cutting rough timber into boards.

Another object resides in the particular means by which my improved tooth is secured to the saw body.

Still another object resides in the general construction of the tooth member, whereby the material being cut will not have its cut edge left ragged, after the same has been sawed.

Other very novel objects and advantages will become apparent as my device is better understood from the specification and claims to follow.

In the drawings:

Figure 1 is a fragmentary view of the side portion of my improved saw and tooth construction.

Fig. 2 is a fragmentary portion of the saw, the same being in perspective elevation, so as to disclose the cut-out portion thereof in which my improved tooth carrying plate is secured.

Fig. 3 is an end view of my improved tooth, looking in the direction of the double prong cutting tooth, and Fig. 4 is a sectional view taken substantially on the line 4—4 of Fig. 1.

Now for a more detailed description of my invention, I refer to the drawings, in which like numerals designate like parts. The circular saw 1, included in my improved construction, is formed with the cut out portion 2. The forward edge portion of the cut is inclined downwardly at 3, and of angular shape in cross section. At the lower end of the edge 3 is an inwardly cut recess 4. The edges of this inwardly cut recess 4 is also angular in cross section, as is the inclined edge 3.

The bottom edge 5 is inclined slightly upwardly to a point 6, this edge portion also being substantially angular in cross section. Opposite from the inclined edge 3, is a substantially shorter inwardly inclined edge portion 7 of similar cross section extending inwardly from the periphery of the circular saw to a point 8.

Between the points 6 and 8 respectively, a substantially semi-circular cut out portion 9 is formed, said semi-circular edge having the groove 10 therein. The improved tooth construction, consists of a plate 11 constructed at the upper forward portion thereof with a slightly rearwardly curved tooth member 12. The upper end portion of this tooth 12 is bifurcated substantially in alinement with the periphery of the circular saw 1, so as to provide a pair of cutter prongs 13 and 14 respectively.

The end portions of these prongs are flared slightly outwardly for the purpose more fully explained hereinafter. The inner edge of the tooth member 12 is substantially circular in extent to a point 15. The upper rear portion of the plates 11 is arcuate in shape to provide a tapering cleaner member 16. At the lower forward portion of the plate, a lug 17 is formed. The semi-circular cut-out portion 18 is formed in the plate at the lower rearward portion thereof.

The plate 11 is adapted to be fitted in the cut-out portion 2 of the circular saw body 1, and so much of the plate 11 as is inserted inwardly beyond the periphery of the saw, allowing for the projection of the tooth member 12, and the cleaner 16, is formed in its edge portion with a substantially V-shaped groove-way 19.

As is clearly shown in Fig. 1 of the drawing by dotted line indications, the substantially angular edge portion of the cut-out part of the saw, is adapted to engage into the V-shaped groove-way in the lower edges of the plate 11. The lug member 17 is adapted to seat in the recess 4 of the cut-out portion of the fork. The semi-circular recess 18 of the plate 11, is adapted to register with the semi-circular cut-out portion of the circular saw body, so as to provide a substantially circular opening to receive the locking ring 20.

When the tooth plate 11 has been properly inserted in the cut-out portion of the saw, so that the lug 17 is seated in the recess 4, the locking ring 20 is inserted in the circular opening formed by the respective semi-circular cut-out portions of the saw body and tooth plate. The locking ring consists of a single strand of preferably stiff wire, of a sufficiently springy nature. The free end portions of the ring are bent inwardly in spaced relation to each other in the manner clearly shown in Fig. 1 of the drawing.

The inwardly bent free ends 21 are adapted to be constricted to reduce the circumferential dimensions of the ring, so that the same may be inserted within the circular openings, in such a manner as to allow the same to be compensated in the respective grooved edges thereof.

By disposing this locking ring in this manner, it will be clearly seen that the tooth plate 11 is snugly locked in association with the circular saw body. The protruding portions of the plates namely, the tooth member 12 and the cleaner member 16 are adapted in the cutting and cut cleaning operation of sawing.

As is clearly shown in Fig. 3 of the drawing, the flared point of the cutter prongs 13 and 14 respectively, are of substantially wider extent than the width of the cleaner member 16. The purpose of this variance rises when in the operation of cutting material, the cutter prongs 13 and 14 respectively, will cut to a greater width than will allow for the lateral engagement of the cleaner 16.

In this manner, the cleaner member will not snag or in any other way rag-edge the cut made by the prongs 13 and 14 respectively.

Having thus described my invention, what I claim an new is:

1. In a saw construction of the character described, a saw body having a plurality of cut-out portions therein in spaced relation to each other, the side edges of each of said cut-out portions being converged inwardly, the forward edge portion of each of said cut-out portions being formed with an inwardly extending recess, the rearward edge of these cut-out portions being formed with a further recess, a plate adapted to be disposed within said cut-out portions, the edges of said plates being engageable with the adjacent edges of the saw, a projection at the forward edge of said plate, said projections adapted for engagement within the recess at the forward edge of the cut, said plates being each formed with a recess at their rearward edge in registry with the rearward recess of the saw, a tooth construction at the top of said plates, and means engageable within said registering openings, whereby the plate will be snugly secured within the cut-out portion of the saw, said means consisting of a split ring, the free ends of said ring being bent inwardly, in spaced parallel relation to each other, whereby the circumference of said ring may be reduced by compressing said edge portion.

2. In a tooth attaching means for saws wherein the saw is formed with a pocket in its edge portion, the edge portion of said pocket being formed with an indenture, the edge of which is longitudinally grooved, a plate provided with a tooth construction thereon, a portion of said plate being adapted for disposition within said pocket, said plate being formed with an indenture, the edge portion of said indenture being longitudinally grooved, the plate being adapted to engage within the pocket so that the indentures will be in registry, a split ring for engagement within the registering indenture for securing the plate to the saw, the end portions of said ring being disposed inwardly of said ring and in spaced parallelism to each other, so that by compressing the said inwardly disposed portions, the circumference of the ring may be reduced to permit the removal of the ring.

In testimony whereof I affix my signature.

WILLIAM DILLED GUINDON.